United States Patent
Deng et al.

(10) Patent No.: US 11,444,798 B2
(45) Date of Patent: Sep. 13, 2022

(54) METHODS AND APPARATUS FOR CONFIGURING A FLEX ETHERNET NODE

(71) Applicant: Telefonaktiebolaget LM Ericsson (publ), Stockholm (SE)

(72) Inventors: Jun Deng, Beijing (CN); Zhenning Zhao, Beijing (CN)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 99 days.

(21) Appl. No.: 16/955,005

(22) PCT Filed: Dec. 22, 2017

(86) PCT No.: PCT/CN2017/117885
§ 371 (c)(1),
(2) Date: Jun. 17, 2020

(87) PCT Pub. No.: WO2019/119389
PCT Pub. Date: Jun. 27, 2009

(65) Prior Publication Data
US 2020/0396097 A1    Dec. 17, 2020

(51) Int. Cl.
*H04L 12/28* (2006.01)
*H04J 3/16* (2006.01)
(Continued)

(52) U.S. Cl.
CPC ............ *H04L 12/28* (2013.01); *H04J 3/1652* (2013.01); *H04L 49/351* (2013.01); *H04L 69/22* (2013.01); *H04J 2203/0085* (2013.01)

(58) Field of Classification Search
None
See application file for complete search history.

(56) References Cited

U.S. PATENT DOCUMENTS

| 2014/0092751 | A1 | 4/2014 | Meilik et al. |
| 2017/0005901 | A1* | 1/2017 | Gareau ................. H04L 43/10 |
| 2018/0076932 | A1* | 3/2018 | Okada ................... H04L 1/0083 |

FOREIGN PATENT DOCUMENTS

| CN | 102136959 A | 7/2011 |
| CN | 106411454 A | 2/2017 |

(Continued)

OTHER PUBLICATIONS

Chinese office action dated Aug. 23, 2021 in connection with Chinese Application No. 201780098312.2, 5 pages.

(Continued)

*Primary Examiner* — Lonnie V Sweet
(74) *Attorney, Agent, or Firm* — Leffler Intellectual Property Law, PLLC

(57) ABSTRACT

Methods and apparatus are provided for processing communications. In one aspect, a method of processing Flex Ethernet (FlexE) data comprises receiving a plurality of data blocks over at least one physical layer connection, each data block corresponding to one of at least one FlexE client flow, wherein data blocks corresponding to a first client flow of the at least one FlexE client flow have a destination over at least one further physical layer connection and contain Ethernet packets and Operation, Administration & Management (OAM) blocks, forming at least one further Ethernet packet containing at least one of the OAM blocks, the at least one further Ethernet packet specifying the destination, and providing the at least one further Ethernet packet to a switching node for forwarding to the destination.

15 Claims, 6 Drawing Sheets

(51) Int. Cl.
H04L 49/351 (2022.01)
H04L 69/22 (2022.01)

(56) References Cited

FOREIGN PATENT DOCUMENTS

| | | | |
|---|---|---|---|
| CN | 106612220 A | 5/2017 |
| CN | 107437973 A | 12/2017 |
| CN | 107437977 A | 12/2017 |
| EP | 3113502 A1 | 1/2017 |
| KR | 20120068584 A | 6/2012 |
| WO | 2017016379 A1 | 2/2017 |

OTHER PUBLICATIONS

English language translation of Chinese office action dated Aug. 23, 2021 in connection with Chinese Application No. 201780098312.2, 4 pages.
Chinese search report dated Aug. 11, 2021 in connection with Chinese Application No. 201780098312.2, 3 pages.
English language translations of Chinese search report dated Aug. 11, 2021 in connection with Chinese Application No. 201780098312.2, 3 pages.
PCT International Search Report, dated Sep. 13, 2018, in connection with International Application No. PCT/CN2017/117885, all pages.
PCT Written Opinion, dated Sep. 13, 2018, in connection with International Application No. PCT/CN2017/117885, all pages.
Stephen J. Trowbridge, "Flex Ethernet Implementation Agreement 1.0", OIF Optical Internetworking Forum, www.oiforum.com, Mar. 2016, 31 pages.
European Communication dated Jun. 23, 2021 in connection with European Application No. 17935729.8, 7 pages.

* cited by examiner

METHODS AND APPARATUS FOR CONFIGURING A FLEX ETHERNET NODE

TECHNICAL FIELD

Examples of the present disclosure relate to methods and apparatus for configuring a Flex Ethernet (FlexE) node.

BACKGROUND

The Flexible Ethernet (FlexE) Implementation Agreement 01.0 defined by the Optical Internetworking Forum (OIF), which is incorporated herein by reference, provides a mechanism for supporting a variety of Ethernet MAC rates that may or may not correspond to any existing Ethernet PHY rate. This includes MAC rates that are both greater than (through bonding) and less than (through sub-rate and channelization) the Ethernet PHY rates used to carry FlexE. A PHY is an implementation of a physical layer, such as for example an optical communications link or a wireless connection between devices. The Implementation Agreement defines FlexE Client MAC rates of 10, 40, and m×25 Gb/s, and defines that a FlexE Group may comprise 1 to n bonded Ethernet PHYs.

SUMMARY

One aspect of the present disclosure provides a method of configuring a first Flex Ethernet (FlexE) node. The method comprises receiving first data from a second FlexE node in time slots over at least one physical layer connection, the first data including overhead identifying assignments of the time slots to one or more client flows in the first data. The method also comprises assigning time slots for transmission of second data to the second FlexE node based on the assignments of time slots in which the first data is received.

Another aspect of the present disclosure provides a computer program comprising instructions which, when executed on at least one processor, cause the at least one processor to carry out the above method. A carrier may contain the computer program and may comprise one of an electronic signal, optical signal, radio signal or computer readable storage medium. A computer program product may comprise non-transitory computer readable media having stored thereon the computer program.

Another aspect of the present disclosure provides apparatus for configuring a first Flex Ethernet (FlexE) node. The apparatus comprises processing circuitry and a memory. The memory contains instructions executable by the processing circuitry such that the apparatus is operable to receive first data from a second FlexE node in time slots over at least one physical layer connection, the first data including overhead identifying assignments of the time slots to one or more client flows in the first data, and assign time slots for transmission of second data to the second FlexE node based on the assignments of time slots in which the first data is received.

A further aspect of the present disclosure comprises apparatus for configuring a first Flex Ethernet (FlexE) node. The apparatus comprises a receiving module configured to receive first data from a second FlexE node in time slots over at least one physical layer connection, the first data including overhead identifying assignments of the time slots to one or more client flows in the first data. The apparatus also comprises an assigning module configured to assign time slots for transmission of second data to the second FlexE node based on the assignments of time slots in which the first data is received.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, programmable logic arrays, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
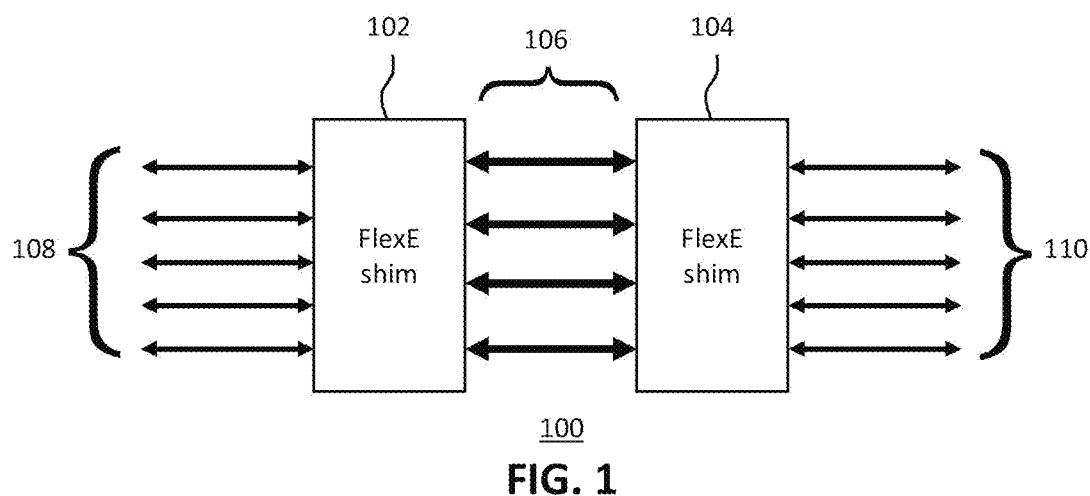
FIG. 1 is a schematic illustration of an example of a FlexE communications system.

FIG. 1 shows an example of a FlexE communications system 100. The system 100 includes a first FlexE shim 102 and a second FlexE shim 104. The FlexE shims 102 and 104 are connected by one or more communication links 106 or PHYs, collectively referred to as a FlexE group. According to the current FlexE standard (Implementation Agreement), a FlexE group may contain between 1 and 254 PHYs.

The first FlexE shim 102 is connected to a number of Ethernet clients 108. The second FlexE shim 10 is connected to the same number of Ethernet clients 110. A client 108 connected to the FlexE shim 102 has a corresponding client 110 connected to the FlexE shim 104, such that the clients may communicate via the shims and over the FlexE group 106.

Figure 2:
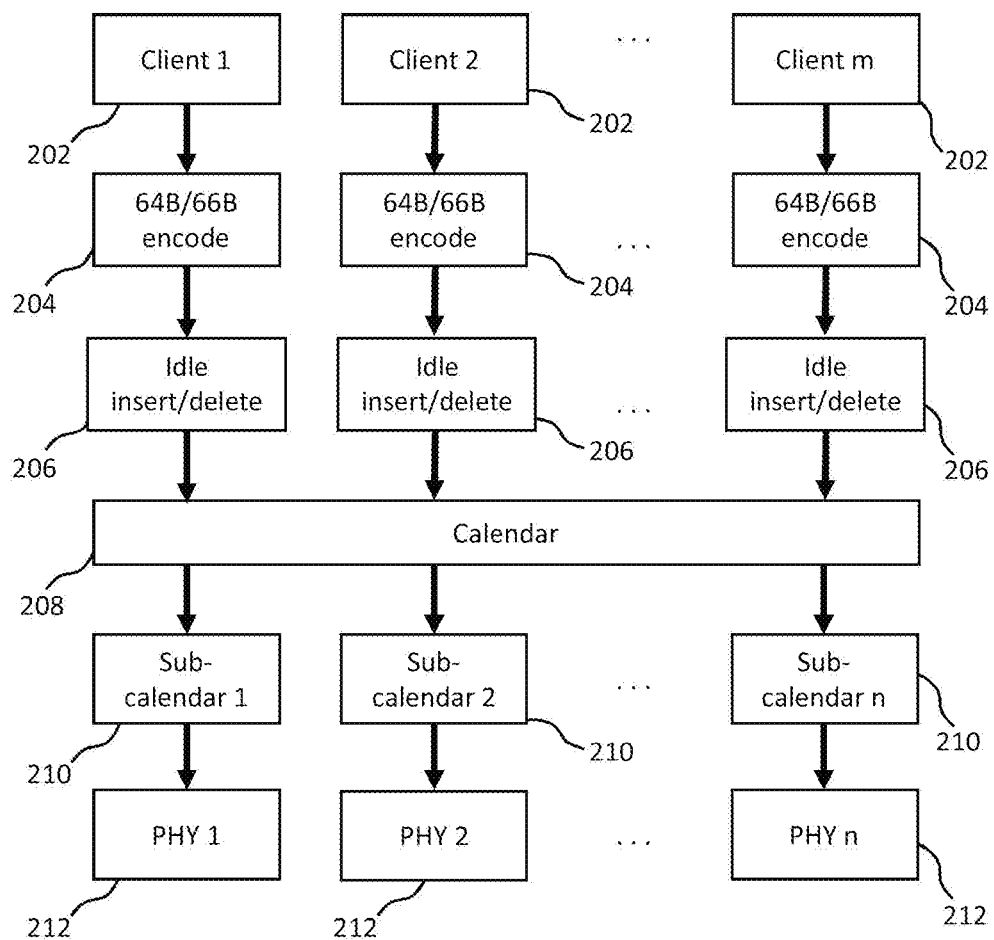
FIG. 2 is a schematic illustration of an example of functions of a FlexE multiplexer.

FIG. 2 shows an example of functions of a FlexE multiplexer (FlexE mux), one or more of which may be implemented by a FlexE shim. A plurality of FlexE clients 202 wish to transmit data to corresponding clients over a PHY or a FlexE group. Each client 202 provides data in the form of 64 bit blocks to a respective 64 B/66 B encode block 204. Each 64 B/66 B encode block 204 encodes 64-bit blocks of data from the respective client as 66-bit blocks, also known as Physical Coding Sublayer (PCS) blocks, and provides the 66-bit blocks to a respective idle insert/delete block 206. The idle insert/delete blocks insert 'idle' control blocks into the data stream when there is no data to transmit from the respective client, and/or when the block rate into calendar function 208 is higher than that provided by the idle insert/delete block 204. The output of each idle insert/delete block 206 is in the form of a stream of 66-bit blocks and is provided to calendar function 208.

The calendar function 208 arranges 66-bit blocks from each idle insert/delete block for scheduling for transmission on the PHYs of a FlexE group. The calendar function provides a respective sub-calendar 210 for each PHY 212 of n PHYs in the FlexE group. Each sub-calendar 210 comprises 66-bit blocks for transmission on a respective PHY 212 of the FlexE group.

The calendar has a granularity of 5 Gbps, and has a length of 20 slots per 100 Gbps of FlexE group capacity. Therefore, for example, where a FlexE group is made up of n 100 Gbps PHYs, the length of the calendar is 20n slots. Each slot carries a 66-bit block. Two calendar configurations are supported: an "A" and a "B" calendar configuration. At any given time, one of the calendar configurations is used for mapping data clocks from the FlexE clients into the calendar. The two calendar configurations are provided to facilitate reconfiguration.

The sub-calendar for a PHY includes a repeating assignment of twenty 66-bit blocks to the FlexE client flows (data from FlexE clients) that are being carried on that PHY. The slots are numbered 0-19. The blocks transmitted on each PHY also include overhead blocks. One 66-bit overhead block is inserted for every 1023 repetitions of the sub-calendar (i.e. after every 1023×20 66-bit data blocks). Eight 66-bit overhead blocks comprise an overhead frame. 32 overhead frames comprise an overhead multiframe.

An overhead multiframe is arranged as follows. The first 66-bit block in an overhead frame in the multiframe has 0x4 B in bits 2-9 and 0x5 in bits 34-37. These two values indicate that the block is the first block in an overhead frame. Each overhead frame also indicates the FlexE group number in which the PHY belongs. The second overhead block (transmitted 1023 sub-calendar repetitions later than the first overhead block) carries PHY information, including a PHY map. There can be 254 PHYs combined in a group (with identification 1-254), and each bit in the 256-bit PHY map indicates whether a PHY with that number exists in the FlexE group. Each overhead frame includes eight bits of the PHY map, and so all of the second overhead frame blocks of the 32-frame overhead multiframe transmit the complete PHY map. The second block of the overhead frame also indicates the PHY number (0-255) of the PHY carrying the overhead frame.

The third block in an overhead frame carries the client distribution information, i.e. the client numbers to which each slot in the 20-slot sub-calendar is assigned. There are twenty 5 Gbps slots in a sub-calendar for a 100 Gbps PHY, so twenty of the third overhead frame blocks in an overhead multiframe are used to indicate which client data each slot carries. There are two calendar configurations, "A" and "B", and so the overhead multiframe indicates, for each of the 20 slots, which client has been assigned that slot for both calendar configurations. The overhead frame also indicates which calendar configuration is currently in use. The bit indicating the calendar in use is repeated three times in the frame to counter transmission errors. Blocks four to eight of the overhead frame are currently reserved for management data.

An overhead block contains a Calendar switch Request (CR) bit that can be used by a sending entity (e.g. sending FlexE shim) to send a request to the receiving entity (eg. Receiving FlexE shim) that a calendar configuration (A or B configuration) other than the one currently being used should be used. An overhead block also contains a Calendar switch Acknowledge (CA) bit used to acknowledge the calendar configuration switch in the reverse direction (i.e. the CA bit is in overhead sent over the PHY in the reverse direction).

The first block in an overhead frame can be used to align incoming data, e.g. determine the slot number of frames following the overhead frame, and determine the slot and overhead frame number for subsequent overhead frames.

Figure 3:
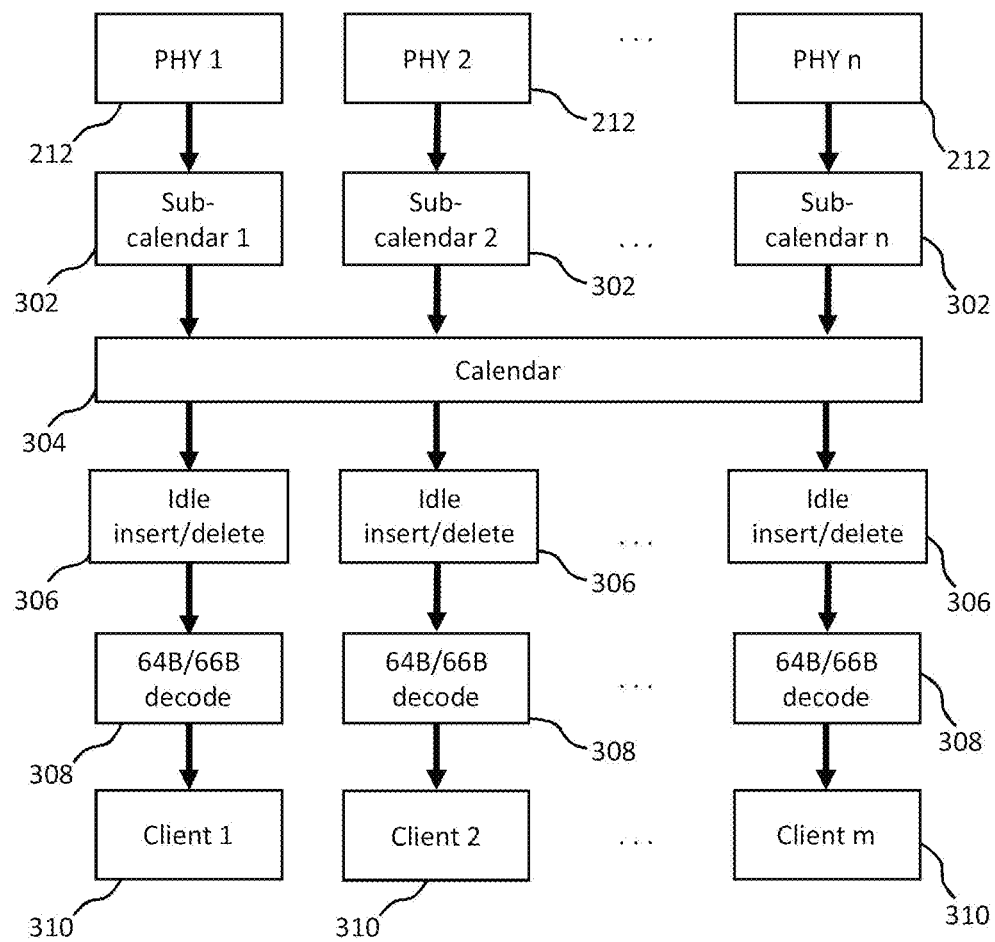
FIG. 3 is a schematic illustration of an example of functions of a FlexE demultiplexer.

FIG. 3 shows an example of functions of a FlexE demultiplexer (FlexE demux), one or more of which may be implemented by a FlexE shim. 66-bit blocks of data are received from each of n PHYs 212 and provided to respective sub-calendars 302. These are arranged into a calendar 304 that may in some implementations be identical to the calendar 208 shown in FIG. 2. The 66-bit blocks from the calendar (not including overhead blocks) are provided to the appropriate idle insert/delete blocks 306, each of which is associated with a client flow for a client. The idle insert/delete blocks may delete idle control blocks from the stream of blocks from the calendar 304. The output of each idle insert/delete block 306 is provided to a respective 64 B/66 B decode block, which decodes the 66-bit blocks into 64-bit data blocks, and provides the 64-bit blocks to the respective one of m clients 310.

Each client 310 is associated with one of the clients 202 shown in FIG. 1, and associated clients communicate in a bi-directional manner. Therefore, for example, a FlexE shim at one end of the PHYs includes a FlexE mux and a demux, and similarly a FlexE shim at the other end of the PHYs also includes a mux and a demux. Associated clients are identified using the same identifier (e.g. client number) in the calendar client distribution information in the overhead going in both directions between the shims.

The information comprising the PHY map and calendar client distribution information (for both calendars) can be used by a FlexE demux to check that the demux is correctly assigning time slots in which data is received to the correct client, and thus to check that the received data is going to the correct client. The information can also be used by the demux to reconfigure the calendar that is not in use (A or B), as the demux can configure the calendar that is not in use using the information in the overhead. The information is sent to the demux in the overhead by a FlexE mux, and may also be determined by the FlexE mux or a system operator.

Figure 4:
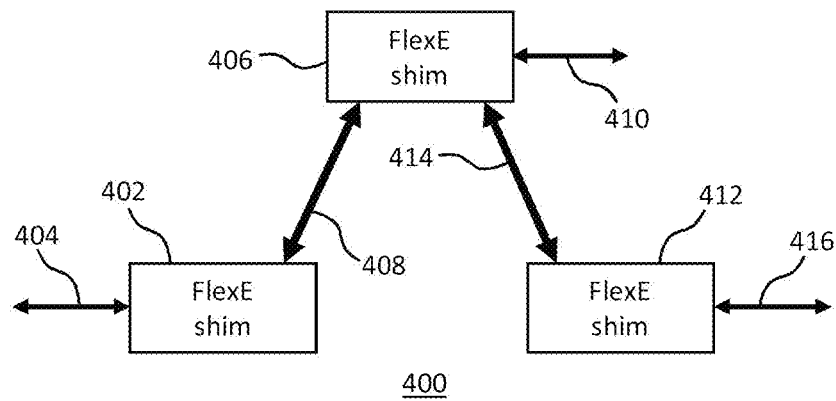
FIG. 4 is a schematic illustration of an example of a FlexE communications system.

FIG. 4 shows an example of another FlexE communications system 400. The system 400 includes a first FlexE shim 402 that receives data from or provides data to first FlexE clients 404. The data may comprise for example Ethernet packets, data blocks or control blocks. The first FlexE shim 402 may communicate with a second FlexE shim 406 over a first FlexE group 408. The second FlexE shim 406 is associated with second clients 410. The second FlexE shim 406 may communicate with third FlexE shim 412 over a second FlexE group 414. The second FlexE shim 412 is associated with third clients 416.

In some cases, a client associated with the first FlexE shim 402 may correspond to a client associated with the third FlexE shim 412 such that the clients wish to exchange data. The second FlexE shim 406 may therefore include switching functionality to direct client flows associated with these clients to the first and third FlexE shims.

Figure 5:
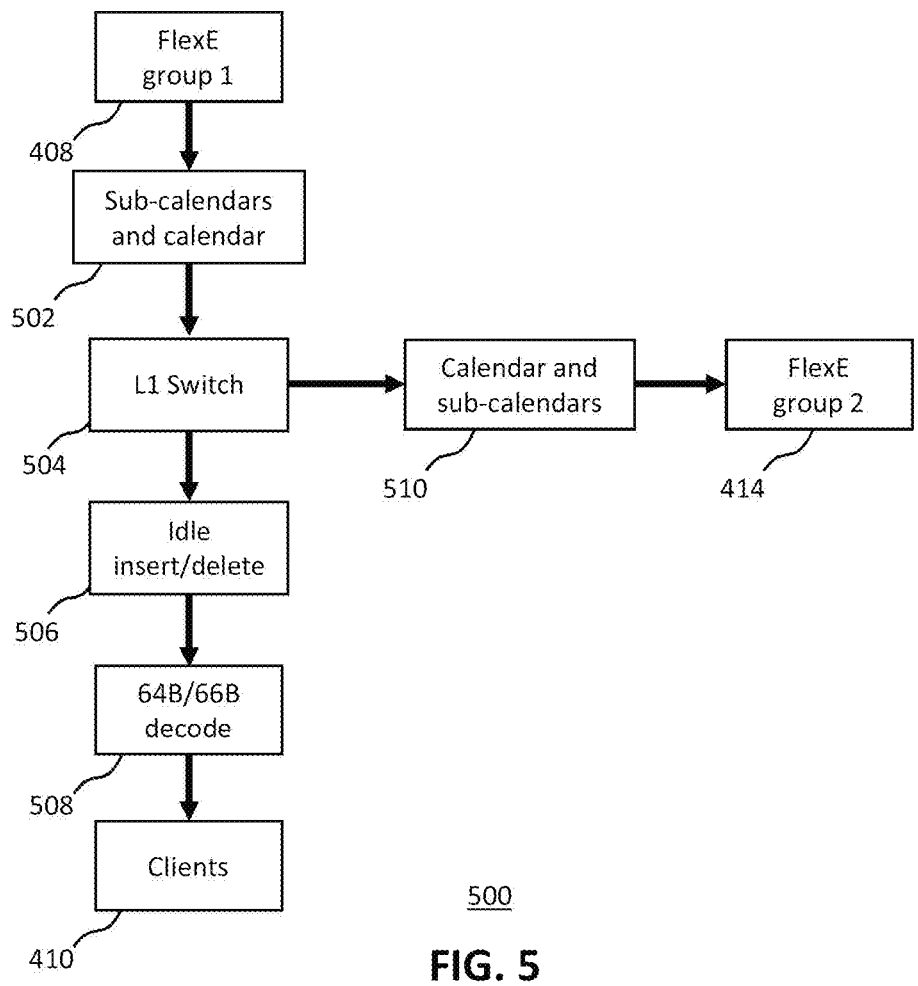
FIG. 5 is a schematic illustration of an example of functions of a FlexE demultiplexer.

FIG. 5 shows an example of functions of an alternative FlexE demultiplexer (FlexE demux) 500, one or more of which may be implemented by a FlexE shim such as the second FlexE shim 406. The FlexE demux receives data over the first FlexE group 408, for example in the form of 66-bit blocks, from the first FlexE shim 402. The data is provided to sub-calendars and calendar block 502. The calendar outputs streams of 66-bit blocks corresponding to respective client flows sent over the first FlexE group 408. The streams are provided to a L1 switch 504. Data associated with second clients 410 is provided to idle insert/delete block 506 to remove idle blocks. The output of the idle insert/delete block is provided to 64 B/66 B decode block 508, and the resulting 64-bit blocks are provided to the appropriate clients 410.

Data for clients 416 associated with the third FlexE shim 412 is provided by L1 switch 504 to a calendar and sub-calendars block 510, which distributes the data over time slots and PHYs in the second FlexE group 414. The demux 500 knows to provide this data to clients 416 over the second FlexE group 414 as the data is received in time slots assigned to those clients.

This configuration may in some examples be implemented by a dedicated hardware connection between hardware associated with the first FlexE group and hardware associated with the second FlexE group. The hardware may comprise, for example, integrated circuits that implement communication over a physical medium such as for example one or more optical fibers. The dedicated hardware connection may comprise for example an optical connection, in which case the FlexE shim or associated hardware may provide data for clients 416 to a port that provides the data to hardware associated with second FlexE group 414. Alternatively, the data may be routed "on-chip" where the same hardware is used for both first and second FlexE groups 408 and 414.

Figure 6:
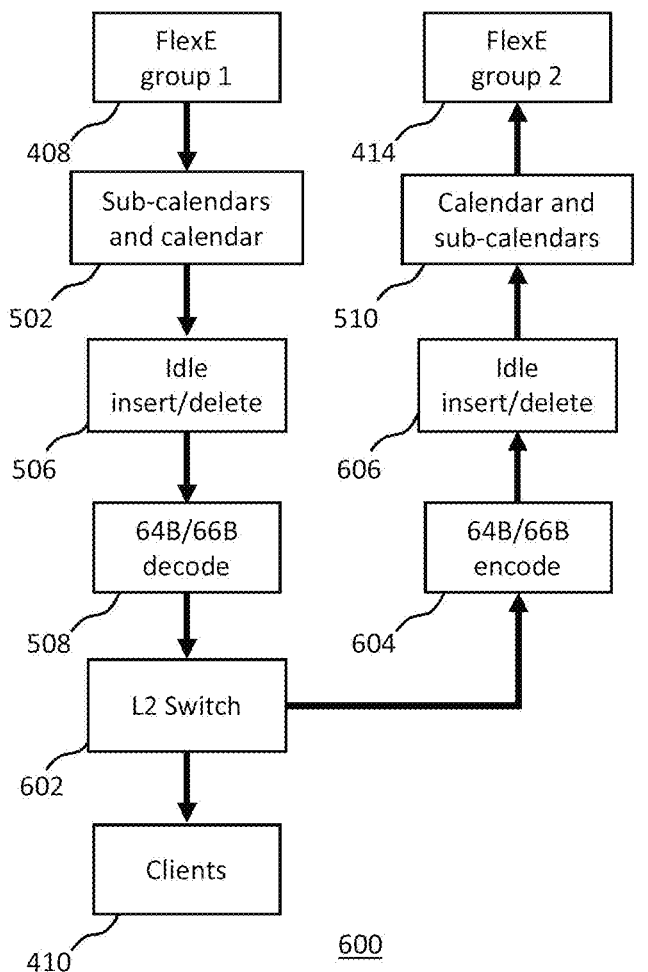
FIG. 6 is a schematic illustration of an example of configuration of a FlexE demultiplexer.

This implementation may however have disadvantages, particularly in terms of cost of implementing the switching functionality and providing the dedicated hardware connections. FIG. 6 shows an example of an alternative configuration of a FlexE demux 600 according to embodiments of this disclosure. The FlexE demux could in some examples be implemented within a FlexE shim. The demux 600 includes some components of the demux 500 of FIG. 5. However, instead of an L1 switch 504, the demux 600 includes an L2 switch 602 that receives data blocks, such as for example 64-bit data blocks, from 64 B/66 B decoder. The L2 switch 602 forms Ethernet packets from the data blocks and provides packets for clients 410 to those clients. The L2 switch 602 also provides packets for clients 416 to 64 B/66 B encode block 604, which converts these packets into 66-bit data blocks and provides the data blocks to idle insert/delete block 606. The idle insert/delete block 606 adds idle blocks where appropriate into the stream of data blocks and provides the blocks to calendar and sub-calendars 510, which distributes the blocks over time slots and PHYs associated with second FlexE group 414 for delivery to the clients 414. Packets for the clients 414 can be identified by the L2 switch by, for example, a MAC address in the packets pointing to one of the clients 414.

Figure 7:
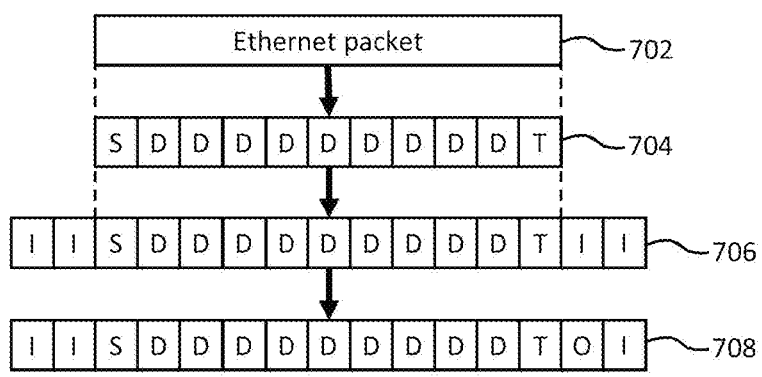
FIG. 7 is a schematic illustrating the operations of part of an example FlexE shim.

FIG. 7 illustrates an example of the operation of part of a FlexE shim, for example part of a FlexE mux. The FlexE receives an Ethernet packet 702 from a client and encodes the packet as a stream 704 of 66 B data blocks, including a start control code block (S), data blocks (D) and a terminate control code block (T). This may be done for example by a 64 B/66 B encode block. An idle insert/delete block may add idle control blocks (I) to the blocks 704 to form a stream of blocks 706. Finally, the shim may add one or more Operations, Administration & Management (OAM) blocks (O) to the stream of blocks, for example by replacing one or more of the idle control blocks, to produce a stream of blocks 708. The stream of blocks 708 is then provided to a calendar for transmission over a FlexE group.

Operations, Administration and Management (OAM) blocks are intended for exchange between devices at both ends of a physical layer connection. Operations for Ethernet OAM, for example, may include discovery, link monitoring, remote fault detection and remote loopback. Therefore, OAM blocks do not form part of a flow of data between Ethernet clients, but are instead used by the connection endpoints. An OAM block is a 66-bit block that is identified by 0x4 B in bits 2-9 and 0xC in bits 34-37. Other bits in the block provide data for OAM purposes.

OAM blocks may be exchanged for example between end points of a FlexE connection. Therefore, referring to FIG. 4, for a client 404 associated with first FlexE shim 402 and a corresponding client 416 in third FlexE shim 412, the endpoints of the FlexE connection (where the second FlexE shim 406 includes switching functionality) are at the FlexE shims 402 and 412. In a configuration of a FlexE demux shown in FIG. 5 for example, the second FlexE shim 412 may receive a client flow for a client 416, and the L1 switch 504 may pass OAM blocks in the client flow to the calendar 510. Hence the OAM blocks may pass through the switch 504, and hence pass through the FlexE shim. However, problem of a configuration such as that shown in FIG. 6 is that the OAM blocks do not form part of Ethernet traffic and cannot form part of extracted Ethernet packets that are output from the L2 switch 602. As a result, the OAM blocks are discarded, and the OAM blocks cannot be correctly exchanged between connection endpoints.

According to some example embodiments of the present disclosure, data corresponding to one or more OAM blocks is contained within Ethernet packets before being passed to a L2 switch. As a result, the OAM blocks can pass through the L2 switch and reach their intended destination. Hence such embodiments do not suffer from the problem of lost OAM blocks as described above, and embodiments can use a L2 switch without using a L2 switch and dedicated hardware or same-chip routing.

Figure 8:
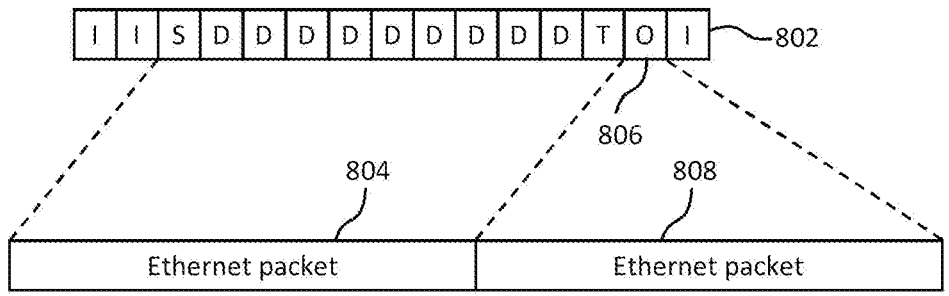
FIG. 8 is a schematic illustrating the operations of part of an example FlexE node.

FIG. 8 illustrates an example of the operation of part of a FlexE node, for example part of a FlexE shim, mux or demux, according to embodiments of this disclosure. For example, a FlexE shim, mux or demux could contain or implement the features of the node. The FlexE node receives a stream 802 of data, control and OAM blocks over a first FlexE group, the stream 802 of blocks being for a destination (e.g. a client) over a second FlexE group. The FlexE node may therefore provide L2 switching functionality. In the example shown, a first Ethernet packet 804 is extracted from the stream 802 of blocks, for example from a start control block, a plurality of data blocks and a terminate control block. When an OAM block 806 is encountered, the FlexE node creates a further Ethernet packet 808. The further Ethernet packet may contain information from the OAM block 806. For example, the Ethernet packet 808 may encapsulate the OAM block 806 such that the OAM block 806 is the payload of the Ethernet packet 808. The further Ethernet packet 808 may include information to ensure that the packet 808 is routed by a L2 switch such that it reaches the correct endpoint. For example, a destination MAC address of the further Ethernet packet 808 may be the same as that of the packet 804.

As a result, when the packets 804 and 808 are provided to a L2 switch for switching functionality, the OAM block can pass through the L2 switch and reach the destination or connection endpoint.

Figure 9:
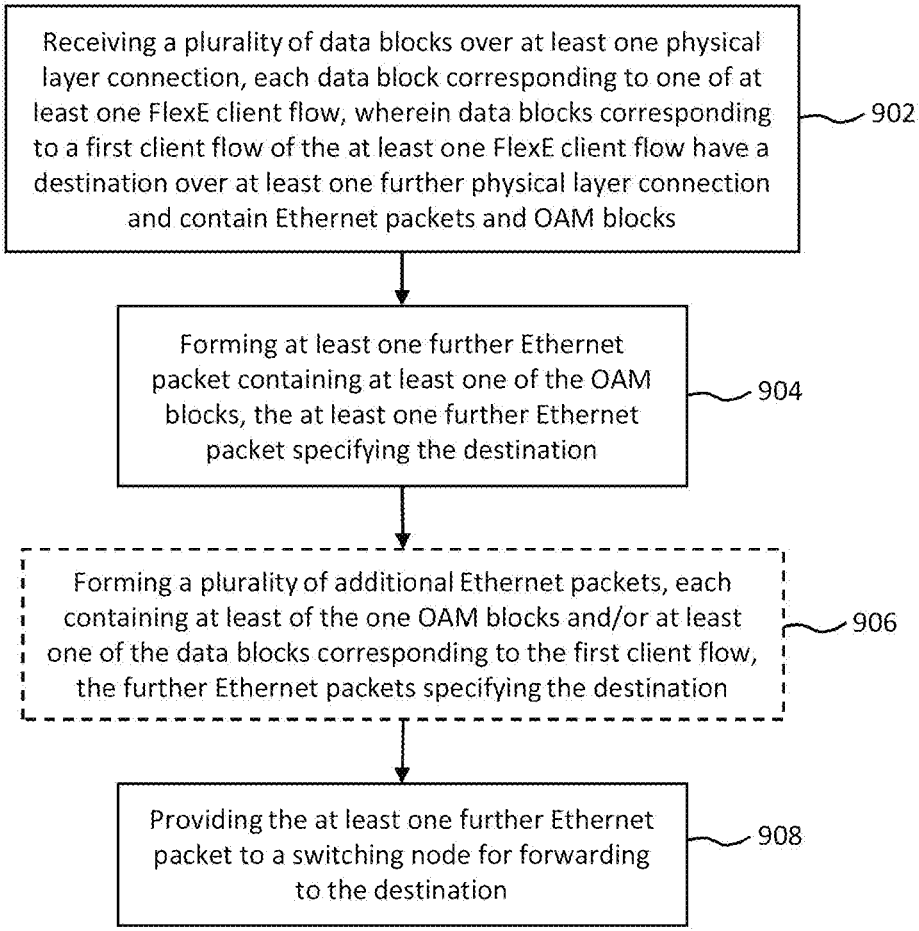
FIG. 9 is a flow chart of an example of a method of processing FlexE data.

FIG. 9 shows an example of a method 900 of processing Flex Ethernet (FlexE) data, for example in a FlexE node, e.g. in a shim, mux or demux. The method 900 may be implemented by, for example, the second FlexE shim 406 shown in FIG. 4. The method 900 comprises, in step 902, receiving a plurality of data blocks over at least one physical layer connection (e.g. first FlexE group 408), each data block corresponding to one of at least one FlexE client flow, wherein data blocks corresponding to a first client flow of the at least one FlexE client flow have a destination over at least one further physical layer connection (e.g. second FlexE group 414) and contain Ethernet packets and OAM blocks. Therefore, the client flow may take the form of, for example, the stream 802 of blocks as shown in FIG. 8. The data blocks may comprise OAM blocks and blocks defined in FIG. 82-5 of the IEEE Standard for Ethernet, 802.3-2015, the entire contents of which are incorporated herein by reference.

Step 904 of the method 900 comprises forming at least one further Ethernet packet containing at least one of the OAM blocks, the at least one further Ethernet packet specifying the destination. The further packet may therefore be, for example, the further packet 808 shown in FIG. 8, and may encapsulate the OAM block.

Step 906 of the method 900 is an optional step comprising forming a plurality of additional Ethernet packets, each containing at least of the one OAM blocks and/or at least one of the data blocks corresponding to the first client flow, the further Ethernet packets specifying the destination. In some examples, step 906 may also include providing the plurality of additional Ethernet packets to the switching node for forwarding to the destination.

Step 908 of the method 900 comprises providing the at least one further Ethernet packet to a switching node, such as for example a L2 switch, for forwarding to the destination.

Therefore, the OAM blocks can traverse the L2 switch. At the destination, the Ethernet packet 804 (and any other Ethernet packets containing data for the client flow) may be provided to the client, whereas the destination may extract the OAM blocks from any packets containing OAM blocks (e.g. Ethernet packet 808).

In the example shown in FIG. 8, the method 900 may comprise forming the Ethernet packets from the data blocks corresponding to the first client flow (e.g. Ethernet packet 804). The method 900 may also comprise providing the Ethernet packets to the switching node. Therefore, for example, referring to FIG. 8, both packets 804 and 808 are provided to the switching node and are forwarded to the destination. In some examples, the packet 808 may also include other blocks from the stream 802 of data blocks.

Figure 10:
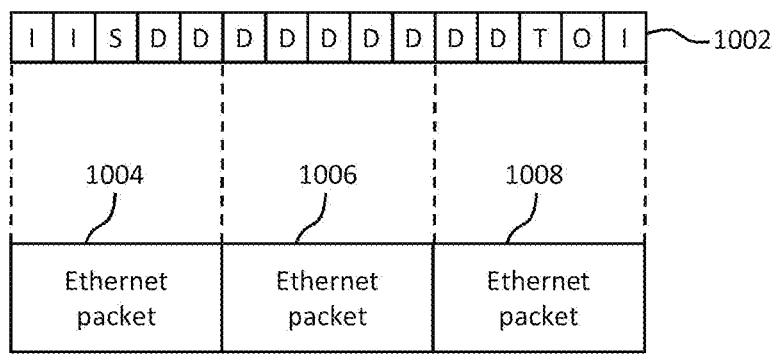
FIG. 10 is a schematic illustrating the operations of part of an example FlexE node.

FIG. 10 illustrates an example of an alternative operation of part of a FlexE node, for example part of a FlexE shim, mux or demux, according to embodiments of this disclosure. For example, a FlexE shim, mux or demux could contain or implement the features of the node. In the example of FIG. 10, the FlexE node receives a stream 1002 of data blocks representing Ethernet packets, OAM blocks, and other control blocks for a client flow. All of the blocks 1002 are encapsulated within Ethernet blocks, regardless of the type of blocks. In the example shown in FIG. 10, each Ethernet packet 1004, 1006 and 1008 contains five blocks from the stream of blocks 1002, though in other examples the number of blocks contained or encapsulated within an Ethernet packet may be different and may vary between packets. The blocks may be included for example as payload of the Ethernet packets. The packets are then provided to an L2 switch for routing to the destination. At the destination, the payloads of all received packets may be extracted to reconstruct the stream of blocks 1002, and thus the OAM block has reached the destination and can be processed accordingly.

In the example shown in FIG. 10, the method 900 may therefore include, for example, encapsulating each one of the data blocks corresponding to the first client flow (e.g. each data block 1002) in the at least one further Ethernet packet or at least one additional Ethernet packet (e.g. packet 1004, 1006 or 1008) and providing the at least one additional Ethernet packet to the switching node for forwarding to the destination.

In some examples, the at least one further Ethernet packet contains at least one of the data blocks corresponding to the first client flow, and so a packet may include both client flow blocks (e.g. those belonging to an Ethernet packet, and idle or other control blocks) and OAM blocks. In some examples, the method 900 comprises forming a plurality of additional Ethernet packets, each containing at least of the one OAM blocks and/or at least one of the data blocks corresponding to the first client flow, the further Ethernet packets specifying the destination, and providing the plurality of additional Ethernet packets to the switching node for forwarding to the destination.

In some examples, the method 900 may be implemented by any suitable function within the FlexE node. For example, referring to FIG. 5, the method 900 may be implemented by the L2 switch 602, which determines that a 64-bit block received from 64 B/66 B decoder 508 is an OAM block. Alternatively, for example, the 64 B/66 B decode block 508 may form multiple 64-bit blocks that comprise an Ethernet packet and provide the blocks to L2 switch 602, which processes the Ethernet packet in the same manner as any other Ethernet packet. In another example, the method 900 may be implemented before the 64 B/66 B decoder, such as in the idle insert/delete block 506, which may determine that an OAM block has been received, and may replace the OAM block with multiple blocks (e.g.

66-bit blocks) that together form a PCS-encoded Ethernet packet. The method 900 may also be implemented in any other suitable manner.

Figure 11:
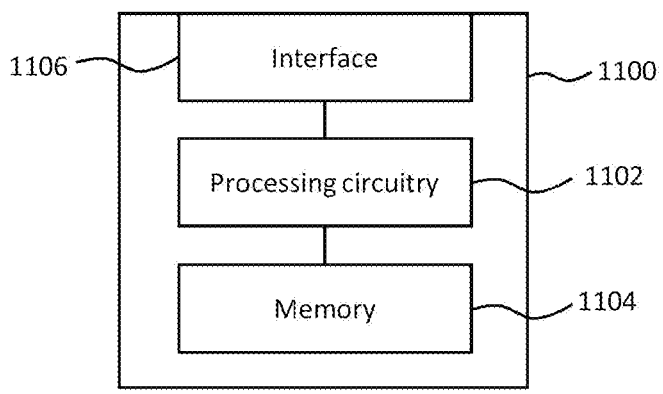
FIG. 11 is a schematic illustration of an example of apparatus for processing FlexE data.

FIG. 11 shows an example of apparatus 1100 for processing Flex Ethernet (FlexE) data. The apparatus 1100 comprises processing circuitry 1102 (e.g. one or more processors) and a memory 1104 in communication with the processing circuitry 1102. The memory 1104 contains instructions executable by the processing circuitry 1102. The apparatus 1100 also comprises an interface 1106 in communication with the processing circuitry 1102 and for communicating with other elements of the communications system. Although the interface 1106, processing circuitry 1102 and memory 1104 are shown connected in series, these may alternatively be interconnected in any other way, for example via a bus In some embodiments, the memory 1104 contains instructions executable by the processing circuitry 1102 such that the apparatus 1100 is operable to receive a plurality of data blocks over at least one physical layer connection, each data block corresponding to one of at least one FlexE client flow, wherein data blocks corresponding to a first client flow of the at least one FlexE client flow have a destination over at least one further physical layer connection and contain Ethernet packets and Operation, Administration & Management (OAM) blocks, form at least one further Ethernet packet containing at least one of the OAM blocks, the at least one further Ethernet packet specifying the destination, and provide the at least one further Ethernet packet to a switching node for forwarding to the destination.

In some examples of the apparatus 1100, the memory 1104 contains instructions executable by the processing circuitry 1102 such that the apparatus 1100 is operable to form the Ethernet packets from the data blocks corresponding to the first client flow, and provide the Ethernet packets to the switching node. In other examples, the memory 1104 contains instructions executable by the processing circuitry 1102 such that the apparatus 1000 is operable to encapsulate each one of the data blocks corresponding to the first client flow in the at least one further Ethernet packet or at least one additional Ethernet packet, and provide the at least one additional Ethernet packet to the switching node for forwarding to the destination.

In some examples of the apparatus 1100, the at least one further Ethernet packet contains at least one of the data blocks corresponding to the first client flow. Therefore, for example, the memory 1104 contains instructions executable by the processing circuitry 1102 such that the apparatus 1100 is operable to form a plurality of additional Ethernet packets, each containing at least one of the OAM blocks and/or at least one of the data blocks corresponding to the first client flow, the further Ethernet packets specifying the destination, and provide the plurality of additional Ethernet packets to the switching node for forwarding to the destination.

In some examples, the memory 1104 contains instructions executable by the processing circuitry 1102 such that the apparatus 1100 is operable to form the at least one further Ethernet packet by including the at least one of the OAM blocks in payload of the at least one further Ethernet packet.

The at least one physical connection may comprise a first FlexE group, and the at least one further physical connection may comprise a second FlexE group.

In some examples, the apparatus 1100 may implement a FlexE shim, FlexE mux or FlexE demux, or may be part of a FlexE shim, FlexE mux or FlexE demux.

Figure 12:
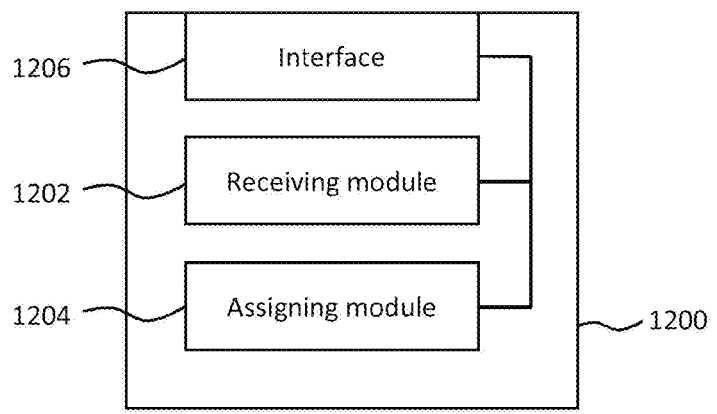
FIG. 12 is a schematic illustration of an example of apparatus for processing FlexE data.

FIG. 12 shows an example of apparatus 1200 for configuring a first Flex Ethernet (FlexE) node. The apparatus 1200 comprises a receiving module 1202 configured to receive first data from a second FlexE node in time slots over at least one physical layer connection, the first data including overhead identifying assignments of the time slots to one or more client flows in the first data. The apparatus 1200 also comprises an assigning module 1204 configured to assign time slots for transmission of second data to the second FlexE node based on the assignments of time slots in which the first data is received. The apparatus 1200 also comprises an interface 1206 for communicating with other elements of the communications system. In the embodiment illustrated in FIG. 12 the interface 1206 as well as receiving and assigning modules are connected to a bus, however, other architectures of the apparatus 1200 are also possible and would be envisaged by those skilled in the art. For example, the modules and interface could be connected in series.

In some examples, the apparatus 1200 includes one or modules configured to form the Ethernet packets from the data blocks corresponding to the first client flow, and provide the Ethernet packets to the switching node. In other examples, the apparatus 1200 includes one or more modules configured to, for each of the data blocks corresponding to the first client flow, encapsulate the data block in the at least one further Ethernet packet or at least one additional Ethernet packet, and provide the at least one additional Ethernet packet to the switching node for forwarding to the destination.

In some examples of the apparatus 1200, the at least one further Ethernet packet contains at least one of the data blocks corresponding to the first client flow. Therefore, for example, the apparatus 1200 includes one or modules configured to form a plurality of additional Ethernet packets, each containing at least one of the OAM blocks and/or at least one of the data blocks corresponding to the first client flow, the further Ethernet packets specifying the destination, and provide the plurality of additional Ethernet packets to the switching node for forwarding to the destination.

In some examples, the apparatus 1200 includes one or modules configured to form the at least one further Ethernet packet by including the at least one of the OAM blocks in payload of the at least one further Ethernet packet.

In some examples, the apparatus 1200 may implement a FlexE shim, FlexE mux or FlexE demux, or may be part of a FlexE shim, FlexE mux or FlexE demux.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of processing Flex Ethernet (FlexE) data, the method comprising:
   receiving a plurality of data blocks over at least one physical layer connection, each data block corresponding to one of at least one FlexE client flow, wherein data blocks corresponding to a first client flow of the at least one FlexE client flow have a destination over at least one further physical layer connection and contain Ethernet packets and Operation, Administration & Management (OAM) blocks;

forming at least one further Ethernet packet containing information from at least one of the OAM blocks, the at least one further Ethernet packet specifying the destination; and providing the at least one further Ethernet packet to a switching node for forwarding to the destination, wherein:
the physical layer connection operates in accordance with a first layer of a communication protocol stack, where the first layer communicates data blocks between first layer peers;
a second layer of the communication protocol stack communicates Ethernet packets between second layer peers;
the switching node forms Ethernet packets from data blocks;
a first output of the switching node is connected to a destination client; and
a second output of the switching node is connected to a path to the at least one further physical layer connection.

2. The method of claim 1, further comprising:
forming the Ethernet packets from the data blocks corresponding to the first client flow; and
providing the Ethernet packets to the switching node.

3. The method of claim 1, wherein the at least one further Ethernet packet contains at least one of the data blocks corresponding to the first client flow.

4. The method of claim 3, further comprising:
forming a plurality of additional Ethernet packets, each containing at least of the one OAM blocks and/or at least one of the data blocks corresponding to the first client flow, the further Ethernet packets specifying the destination; and
providing the plurality of additional Ethernet packets to the switching node for forwarding to the destination.

5. The method of claim 1, further comprising encapsulating each one of the data blocks corresponding to the first client flow in the at least one further Ethernet packet or at least one additional Ethernet packet, and providing the at least one additional Ethernet packet to the switching node for forwarding to the destination.

6. The method of claim 1, wherein forming the at least one further Ethernet packet comprises including the at least one of the OAM blocks in payload of the at least one further Ethernet packet.

7. The method of claim 1, wherein the at least one physical connection comprises a first FlexE group, and the at least one further physical connection comprises a second FlexE group.

8. A non-transitory computer readable storage medium comprising instructions which, when executed on at least one processor, cause the at least one processor to carry out a method of processing Flex Ethernet (FlexE) data, the method comprising:
receiving a plurality of data blocks over at least one physical layer connection, each data block corresponding to one of at least one FlexE client flow, wherein data blocks corresponding to a first client flow of the at least one FlexE client flow have a destination over at least one further physical layer connection and contain Ethernet packets and Operation, Administration & Management (OAM) blocks;

forming at least one further Ethernet packet containing information from at least one of the OAM blocks, the at least one further Ethernet packet specifying the destination; and providing the at least one further Ethernet packet to a switching node for forwarding to the destination, wherein:
the physical layer connection operates in accordance with a first layer of a communication protocol stack, where the first layer communicates data blocks between first layer peers;
a second layer of the communication protocol stack communicates Ethernet packets between second layer peers;
the switching node forms Ethernet packets from data blocks;
a first output of the switching node is connected to a destination client; and
a second output of the switching node is connected to a path to the at least one further physical layer connection.

9. Apparatus for processing Flex Ethernet (FlexE) data, the apparatus comprising a processor and a memory, the memory containing instructions executable by the processing circuitry such that the apparatus is operable to:
receive a plurality of data blocks over at least one physical layer connection, each data block corresponding to one of at least one FlexE client flow, wherein data blocks corresponding to a first client flow of the at least one FlexE client flow have a destination over at least one further physical layer connection and contain Ethernet packets and Operation, Administration & Management (OAM) blocks;

form at least one further Ethernet packet containing information from at least one of the OAM blocks, the at least one further Ethernet packet specifying the destination; and provide the at least one further Ethernet packet to a switching node for forwarding to the destination, wherein:
the physical layer connection operates in accordance with a first layer of a communication protocol stack, where the first layer communicates data blocks between first layer peers;
a second layer of the communication protocol stack communicates Ethernet packets between second layer peers;
the switching node forms Ethernet packets from data blocks;
a first output of the switching node is connected to a destination client; and
a second output of the switching node is connected to a path to the at least one further physical layer connection.

10. The apparatus of claim 9, wherein the memory contains instructions executable by the processing circuitry such that the apparatus is operable to:
form the Ethernet packets from the data blocks corresponding to the first client flow; and
provide the Ethernet packets to the switching node.

11. The apparatus of claim 9, wherein the at least one further Ethernet packet contains at least one of the data blocks corresponding to the first client flow.

12. The apparatus of claim 11, wherein the memory contains instructions executable by the processing circuitry such that the apparatus is operable to:
- form a plurality of additional Ethernet packets, each containing at least one of the OAM blocks and/or at least one of the data blocks corresponding to the first client flow, the further Ethernet packets specifying the destination; and
- provide the plurality of additional Ethernet packets to the switching node for forwarding to the destination.

13. The apparatus of claim 9, wherein the memory contains instructions executable by the processing circuitry such that the apparatus is operable to, for each of the data blocks corresponding to the first client flow, encapsulate each one of the data blocks corresponding to the first client flow in the at least one further Ethernet packet or at least one additional Ethernet packet, and provide the at least one additional Ethernet packet to the switching node for forwarding to the destination.

14. The apparatus of claim 9, wherein the memory contains instructions executable by the processing circuitry such that the apparatus is operable to form the at least one further Ethernet packet by including the at least one of the OAM blocks in payload of the at least one further Ethernet packet.

15. The apparatus of claim 9, wherein the at least one physical connection comprises a first FlexE group, and the at least one further physical connection comprises a second FlexE group.

\* \* \* \* \*